United States Patent
Lim

(10) Patent No.: US 7,746,503 B2
(45) Date of Patent: Jun. 29, 2010

(54) METHOD OF AND DEVICE FOR IMAGE ENHANCEMENT

(75) Inventor: Sung-Hyun Lim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 779 days.

(21) Appl. No.: 11/032,199

(22) Filed: Jan. 11, 2005

(65) Prior Publication Data

US 2005/0157941 A1    Jul. 21, 2005

(30) Foreign Application Priority Data

Jan. 15, 2004    (KR) ............... 10-2004-0003047

(51) Int. Cl.
*G06K 15/00*    (2006.01)
*G06T 5/00*    (2006.01)
*H04N 1/409*    (2006.01)
*H04N 1/60*    (2006.01)

(52) U.S. Cl. ................... 358/3.27; 358/1.9
(58) Field of Classification Search .......... 358/3.27, 358/1.9, 2.1, 515–522, 527, 532–536; 382/199
See application file for complete search history.

(56) References Cited

U.S. PATENT DOCUMENTS 5,442,459 A * 8/1995 Gahang ............ 358/426.02
6,608,942 B1 * 8/2003 Le ...................... 382/279
6,868,180 B2 * 3/2005 Akahori et al. ......... 382/167
7,181,087 B2 * 2/2007 Kang et al. ............. 382/270

FOREIGN PATENT DOCUMENTS

JP    10-257326    9/1998
JP    10-257327    9/1998
KR    1993-0005458    3/1993

OTHER PUBLICATIONS

Fisher et al., Logical AND/NAND, Hypermedia Image Processing Reference, 1994, University of Edinburgh, http://www.cee.hw.ac.uk/hipr/html/and.html.*

* cited by examiner

*Primary Examiner*—Douglas Q Tran
(74) *Attorney, Agent, or Firm*—Roylance, Abrams, Berdo & Goodman, LLP

(57) ABSTRACT

A method of enhancing an image comprises determining whether brightness values have changed in an output screen of documents that include a text and an image, with respect to a pixel located in a predetermined edge detection region; calculating binarization data values based on each pixel brightness values of a plurality of windows that are formed by applying different samplings to the detected region, when the brightness values are changed in excess of a predetermined threshold Tha, and determining a connectivity of the calculated binarization data values with respect to each of a plurality of windows; estimating the pixel to be edge pixel when the binarization data values have a connectivity; and determining finally the estimated pixel to be an edge pixel when a number of pixels estimated as an edge is in excess of a predetermined fixed value THd, and if not, determining the estimated edge pixel as not being an edge pixel.

14 Claims, 5 Drawing Sheets

FIG. 3A col.1

| row1 | 197 | 184 | 166 | 150 | 125 | 98 | 87 | 98 | 101 |
|---|---|---|---|---|---|---|---|---|---|
| | 174 | 155 | 129 | 108 | 89 | 90 | 89 | 112 | 135 |
| | 159 | 123 | 106 | 91 | 84 | 91 | 123 | 144 | 173 |
| | 133 | 111 | 96 | 101 | 117 | 132 | 162 | 177 | 195 |
| | 108 | 111 | 116 | 132 | 150 | 168 | 188 | 202 | 205 |

FIG. 3B

| 166 | 125 | 87 |
|---|---|---|
| 106 | 84 | 123 |
| 116 | 150 | 188 |

FIG. 3C

| 184 | 125 | 98 |
|---|---|---|
| 123 | 84 | 144 |
| 111 | 150 | 202 |

FIG. 3D

| 197 | 125 | 101 |
|---|---|---|
| 159 | 84 | 173 |
| 108 | 150 | 205 |

FIG. 3E

| 0 | 0 | 1 |
|---|---|---|
| 1 | 1 | 1 |
| 1 | 0 | 0 |

| 0 | 1 | 1 |
|---|---|---|
| 1 | 1 | 0 |
| 1 | 0 | 0 |

| 0 | 1 | 1 |
|---|---|---|
| 0 | 1 | 0 |
| 1 | 1 | 0 |

| | col.1 | | | | | | | |
|---|---|---|---|---|---|---|---|---|
| row1 | 167 | 169 | 184 | 197 | 203 | 193 | 182 | 169 | 160 |
| | 198 | 193 | 188 | 175 | 160 | 157 | 168 | 183 | 187 |
| | 204 | 200 | 184 | 151 | 124 | 124 | 147 | 180 | 185 |
| | 204 | 200 | 188 | 152 | 130 | 123 | 150 | 184 | 188 |
| | 196 | 201 | 199 | 178 | 155 | 151 | 170 | 187 | 193 |

FIG. 4B

| 184 | 203 | 182 |
|---|---|---|
| 184 | 124 | 147 |
| 199 | 155 | 170 |

FIG. 4C

| 169 | 203 | 169 |
|---|---|---|
| 200 | 124 | 180 |
| 201 | 155 | 187 |

FIG. 4D

| 167 | 203 | 160 |
|---|---|---|
| 204 | 124 | 185 |
| 196 | 155 | 193 |

FIG. 4E

| 0 | 0 | 1 |
|---|---|---|
| 0 | 1 | 1 |
| 0 | 1 | 1 |

| 1 | 0 | 1 |
|---|---|---|
| 0 | 1 | 1 |
| 0 | 1 | 0 |

| 1 | 0 | 1 |
|---|---|---|
| 0 | 1 | 1 |
| 0 | 1 | 0 |

| $a_{11}$ | $a_{12}$ | $a_{13}$ |
|---|---|---|
| $a_{21}$ | $a_{22}$ | $a_{23}$ |
| $a_{31}$ | $a_{32}$ | $a_{33}$ |

FIG. 5B

| $b_{11}$ | $b_{12}$ | $b_{13}$ |
|---|---|---|
| $b_{21}$ | $b_{22}$ | $b_{23}$ |
| $b_{31}$ | $b_{32}$ | $b_{33}$ |

FIG. 5C

| $C_{11}$ | $C_{12}$ | $C_{13}$ |
|---|---|---|
| $C_{21}$ | $C_{22}$ | $C_{23}$ |
| $C_{31}$ | $C_{32}$ | $C_{33}$ |

FIG. 6A

|  |  |  |
|---|---|---|
|  |  |  |
|  | x |  |

FIG. 6B

| E | E | N |
|---|---|---|
| E | E | E |
| E | N | E |

NUMBER OF E = 7

FIG. 6C

| E | N | N |
|---|---|---|
| E | N | E |
| N | E | E |

NUMBER OF E = 5

METHOD OF AND DEVICE FOR IMAGE ENHANCEMENT

PRIORITY

This application claims priority under 35 U.S.C. §119(a) to Korean Patent Application No. 2004-03047, entitled "Method of and Device for Image Enhancement", filed on Jan. 15, 2004, in the Korean Intellectual Property Office, the entire contents of which are hereby incorporated by reference.

BACKGROUND OF THE INVENTION

1. Field of the Invention

The present invention relates to a method of, and a device for enhancing an image that obtains improved quality output when a printer prints a document printed with respect to an image input from an image scanning device. More particularly, the present invention relates to a method of, and a device for enhancing an image that distinguishes an actual edge of a text region from an edge of an image region to emphasize the actual edge of the text region.

2. Description of the Related Art

An image enhancement apparatus operates to ensure that a given image is converted to the extent that a human can easily discern. An example of a general image enhancement apparatus and method thereof is disclosed in Korean Patent No. 10-2002-0059531 (the '531 Korean Patent), the entire contents of which are hereby incorporated by reference, which discloses a method and device for enhancing the quality of a text and image document. The '531 Korean Patent device mainly comprises a classification unit, a post-process unit, an emphasis unit.

The classification unit of the '531 Korean Patent uses saturation, slope information, and the number of connecting element number to estimate pixels to be processed as either 'T', 'I' and 'U' pixels. The post-process unit corrects errors in classified information to determine 'T' or 'I' pixels. The emphasis unit emphasizes a present pixel from the classified 'T' information to obtain an improved image.

The above-described conventional method compares the average values of the mask and brightness value of each pixel from a single window mask to extract a binary value and calculate a connecting element value N. Because the conventional method uses only a single window to calculate a connecting element value N, characteristics around the target pixel can not be fully reflected. Accordingly, edge detection accuracy may be decreased or the requirements for memory and calculation increased, especially for documents that are output based on a low line per inch (LPI) requirement, such as a newspaper having characteristics around the observed pixel similar to a letter.

The conventional method computes the binary data on the basis of average values in a window mask. The number of pixels having the binarization data value of 1 is not regular. Therefore, the possibility of mis-classification increases between a text edge and a halftone image edge, when the edge is configured diagonally.

SUMMARY OF THE INVENTION

The present invention has been developed in order to solve the drawbacks discussed above, as well as others not mentioned, and other problems associated with the conventional arrangement. An aspect of the present invention is to provide a method and device for enhancing image quality wherein an actual edge of a text region and an edge of an image region are distinguished from each other, and only the actual edge of text region are allowed to pass through a high frequency improving filter so that an improved quality reproducing image can be obtained.

It is another aspect of the present invention to provide a method and a device for enhancing image quality that considers a relativity and similarity of each binarization data of a plurality of windows to output an improved image and text mixed document, regardless of the LPI characteristic.

It is yet another aspect of the present invention to provide a method and device for enhancing image quality that calculates a binarization data value using a threshold value preset by a user, and keeps the regular number of pixels having the binarization data value of 1 to reduce the possibility of mis-classification between an edge of a text region and an edge of an image region.

The above-mentioned aspects and/or other features of the present invention can be substantially achieved by providing a method of enhancing an image comprising determining whether brightness values have changed with respect to a pixel located in a predetermined edge detection region in an output screen of documents that includes a text and an image, calculating binarization data values based on each pixel brightness values of a plurality of windows that are formed by applying different samplings to the detected region when the brightness values are in excess of a predetermined threshold THa, and determining a connectivity of the calculated binarization data values with respect to each of a plurality of windows, estimating the predetermined pixel to be an edge pixel when the binarization data values exhibit connectivity, and determining that the predetermined pixel is an edge pixel when the number of predetermined pixels estimated as edge pixels are in excess of a predetermined preset value THd, and if the number of predetermined pixels estimated as edge pixels are not in excess of the predetermined preset value, determining that the predetermined pixel is not an edge pixel.

When the binarization data values exhibit connectivity, the step of estimating the predetermined pixel to be an edge pixel can further comprise determining a similarity of the binarization data values of pixels corresponding to each of the plurality of windows, and estimating the predetermined pixel to be an edge pixel when the binarization data values of the predetermined pixel corresponding to each of the plurality of windows have a similarity.

The method of enhancing an image according to an embodiment of the present invention further comprises emphasizing the pixel determined as an edge. The step of emphasizing the pixel determined to be an edge further comprises estimating as a pixel to not be edge pixel when the change of each pixel brightness value is less than the predetermined threshold THa.

The method of enhancing an image according to an embodiment of the present invention further comprises the step of estimating a pixel to not be an edge pixel when the binarization data values have no connectivity. The method of enhancing an image according to an embodiment of the present invention further comprises the step of estimating the predetermined pixel to not be an edge pixel when the binarization data values of the predetermined pixel corresponding to a plurality of windows have no similarity.

The step of calculating binarization data values according to an embodiment of the present invention further comprises generating a plurality of 3×3 window masks by applying different samplings to a 5×9 window of the detection region wherein a predetermined brightness value is indicated on each pixel, generating binarization data values from the brightness values of each pixel of a plurality of the sampled 3×3 window masks, and grouping the binarization data values to calculate a connected component value N with respect to each window mask. The samplings as applied can comprise 5×5, 5×7 and 5×9 samplings with respect to a 600 dpi image.

The binarization data value can be '1' when the brightness value of each pixel is less than a predetermined threshold THb, and the binarization value is '0' when the brightness value of each pixel exceeds the predetermined threshold THb. The binarization data values can be estimated to have connectivity when all the connected component values N of each window mask are '1'. The similarity of the binarization data value is determined by the equation:

$$\sum_{i=0}^{3}\sum_{j=0}^{3} a_{ij}b_{ij}c_{ij} \geq THc$$

wherein $a_{ij}$, $b_{ij}$, $c_{ij}$ are binarization data values of each pixel, THc is a predetermined threshold. The binarization data values are considered to have a similarity when the equation above is satisfied.

The above-mentioned aspects and/or other features of the present invention can be substantially achieved by providing an image enhancement apparatus, comprising an edge classification unit for estimating an actual edge of a text region in a predetermined edge detection region of an output screen with respect to a document having text and image, an edge detection unit for confirming the edge estimated pixel to be a pixel edge if the number of the predetermined pixels estimated as pixel edges is in excess of a predetermined preset threshold THd, and if not, determining the edge estimated pixel to not be edge pixel, and an edge emphasis unit for emphasizing the pixel confirmed as an edge pixel.

The edge classification unit can further comprise a luminosity variance measurement unit for determining whether brightness value has changed with respect to the pixels in a predetermined edge detection region and a half tone detection unit for calculating binarization data value based on each pixel brightness value of a plurality of windows that are formed by applying various samplings to the detection region when the brightness values are in excess of a predetermined threshold Tha, determining a connectivity of the calculated binarization data values with respect to each of a plurality of windows, determining a similarity of the binarization data values of pixel corresponding to the plurality of windows when the binarization values have a connectivity, and estimating the predetermined pixel as an edge when the binarization data values have a similarity. The binarization data value can be '1' if each pixel brightness is less than a predetermined threshold THb, and the binarization data value can be '0' if each pixel brightness exceeds the predetermined threshold THb.

BRIEF DESCRIPTION OF THE DRAWINGS

The above aspects and features of the present invention will be more apparent by describing certain embodiments of the present invention with reference to the accompanying drawings, in which:

FIGS. 3A through 4G are views of window masks in a text region for explaining the method of generating binarization data and a connected component value according to an embodiment of the present invention;

FIGS. 5A-C are examples of window masks for measuring a similarity between connected components being binarized in a plurality of windows according to an embodiment of the present invention;

FIG. 6A is a view illustrating a post-process region of a window mask for detecting an edge according to an embodiment of the present invention;

FIG. 6B is a view illustrating an example of a window mask being detected as an edge according to an embodiment of the present invention, and FIG. 6C is a view illustrating an example of a window mask detected as having no edge according to an embodiment of the present invention.

DETAILED DESCRIPTION OF THE EXEMPLARY EMBODIMENTS

Figure 1:
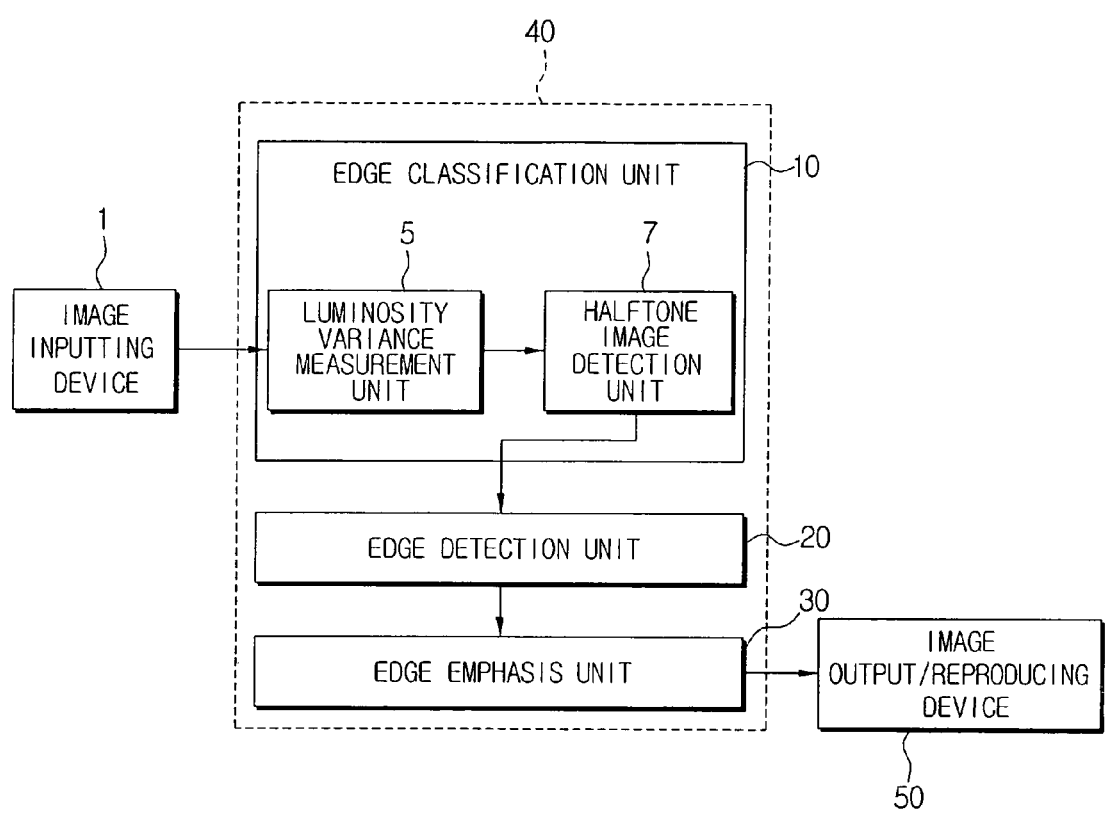
FIG. 1 is a view illustrating a block diagram of an image enhancement apparatus according to an embodiment of the present invention.

Several embodiments of the present invention will now be described in detail with reference to the annexed drawings. In the drawings, the same or similar elements are denoted by the same reference numerals even though they are depicted in different drawings. The matters defined in the description such as a detailed construction and elements are provided to assist in a comprehensive understanding of the embodiments of the present invention. Accordingly, those of ordinary skill in the art will recognize that various changes and modifications to the embodiments described herein can be made without departing from the scope and spirit of the present invention. In the following description, a detailed description of known functions and configurations incorporated herein have been omitted for conciseness and clarity.

Figure 2:
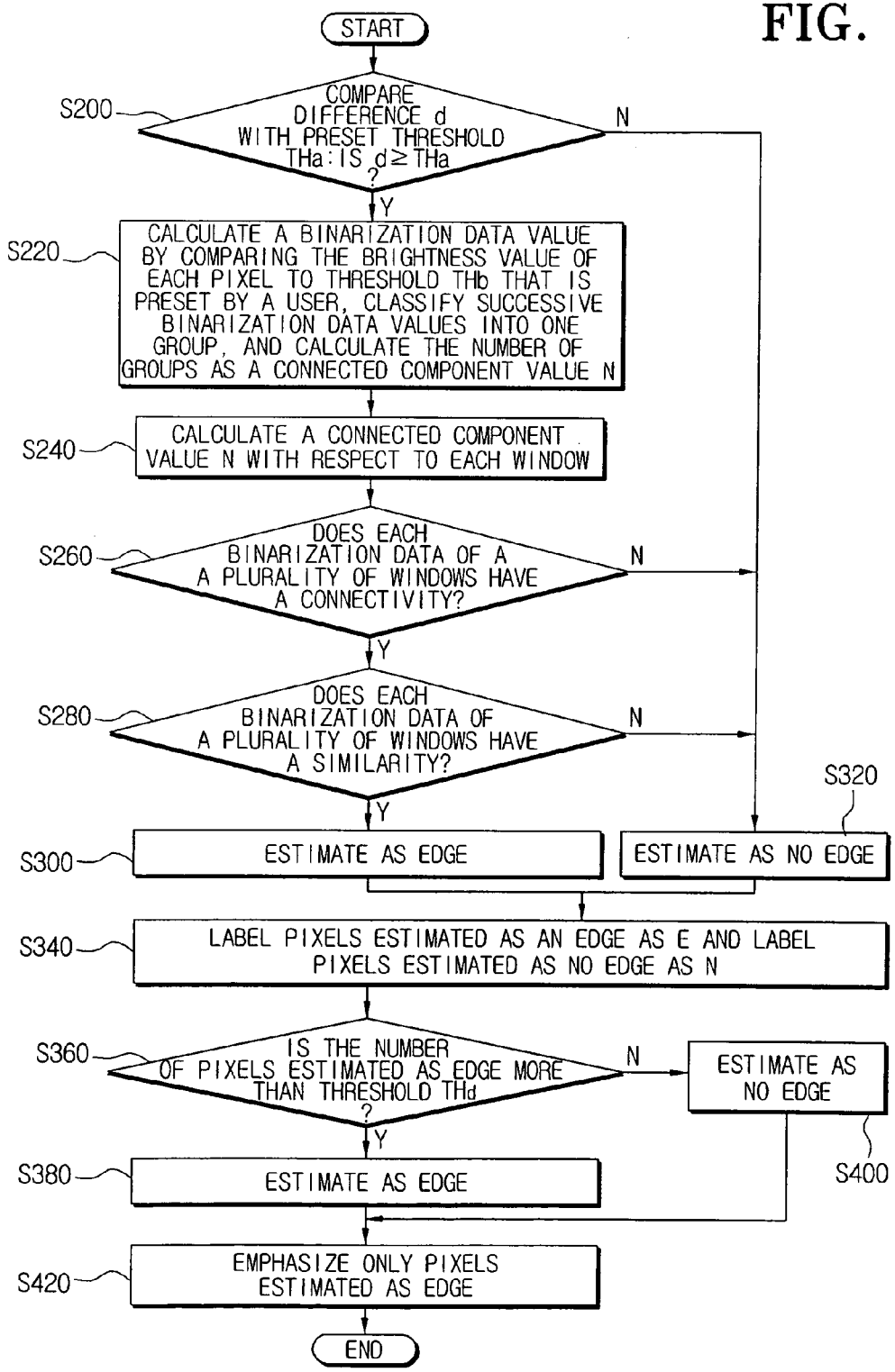
FIG. 2 is a view illustrating a flow chart for an image enhancement method according to an embodiment of the present invention.

Throughout the following detailed description of the exemplary embodiments of the present invention, reference is made to FIG. 2, which illustrates a method for implementing the embodiments of the present invention. The references are made to the various steps, for example step S200, S220, and so on. Attention should be directed towards FIG. 2 in such instances in order to appreciate the method.

FIG. 1 is a block diagram of an image enhancement apparatus according to an embodiment of the present invention. An image enhancement apparatus 40 comprises an edge classification unit 10 that preliminarily classifies edges, an edge detection unit 20 that detects an edge for final emphasis after post-process, and edge emphasis unit 30 that emphasizes the detected edge.

The image enhancement apparatus 40 detects and emphasizes an edge with respect to the image being input from an image inputting device 1, and provides the information after the emphasis to an image output/reproducing device 50 such as a printer. The edge classification unit 10 comprises a luminosity variance measure unit 5 and halftone image detection unit 7. The luminosity variance measurement unit 5 measures a luminosity variance of pixels around a target pixel to classify the edges. The surrounding pixels are not estimated to be an edge when the luminosity variance is less than a predetermined threshold THa.

When documents are scanned using a high definition scanner with over 300 DPI resolution, the luminosity variance is sensed at intervals of "line per inch" (LPI) corresponding to the documents in an image region having a constant brightness. The luminosity variances act as noise, and severely deteriorate the image quality when an edge is emphasized. In one exemplary embodiment of the present invention, an image region having a constant brightness is defined as a halftone image region. A halftone image detection unit 7 distinguishes an actual edge in a text region from an edge in the above-described halftone image region. The halftone image detection unit 7 estimates that a pixel is not an edge pixel when the pixel is determined as halftone image.

The edge detection unit 20 receives the pixel estimated as an edge pixel in an edge classification unit 10 and detects the edge pixel to be finally emphasized. The edge emphasis unit 30 applies a high frequency improving filter to emphasize the edge pixel detected from the edge detection unit 20.

FIG. 2 is a view illustrating a flow chart for an image enhancement method according to an embodiment of the present invention. The luminosity variance measurement unit 5 of the edge classification unit 10 determines whether the brightness value has changed with respect to pixels in a predetermined edge detection region. For measuring the luminosity variance, a sobel or laplacian operator can be used. Additionally, a difference d between the highest brightness value and the lowest brightness value can also be used for measuring the luminosity variance.

According to an exemplary embodiment of the present invention, the luminosity variance of pixels is measured by use of a difference d between the highest value and the lowest value in the corresponding window. In decision step S200 of the method according to an embodiment of the present invention, the user sets in advance a proper threshold THa, and compares the difference d between the highest brightness value and the lowest brightness value of each pixel, with the preset threshold THa to determine a luminosity variance of each pixel.

If the difference d between the highest brightness value and the lowest brightness value does not equal or exceed the threshold THa, it is determined that no luminosity variance occurred and no edge is estimated ("No" path from decisions step S200; step S320). If the difference d between the highest brightness value and the lowest brightness value equals or exceeds the threshold Tha ("Yes" path from decision step S200), it is determined that a luminosity variance has occurred, and therefore, a binarization data value is generated based on the brightness value of each pixel (step S220). The process of generating the binarization data value is explained as below.

FIGS. 3A through 4G are views of window masks in a text region for explaining the method of generating binarization data and a connected component value according to an embodiment of the present invention. The discussion below with respect to FIGS. 3A through 4G encompass steps S220, S240 and S280. FIG. 3A illustrates the pixel brightness value for a 5×9 window mask in a text region. The higher the number in each box (each box corresponding to one particular pixel), the brighter that individual pixel is. For example, the brightness value for the mask position 1,1 (row, column) is 108. That indicates a slightly less bright pixel than the brightness value for pixel 4,8, which has a brightness value of 112. FIG. 3B is a view illustrating a 3×3 window mask generated by a 5×5 sampling of the 5×9 window mask of FIG. 3A. The 5×5 sampling samples pixels located in the first, third and fifth rows, and in the third, fifth and seventh columns of the 5×9 window mask, and is generated with respect to a central pixel (indicated as 'x') of the 5×9 window mask.

FIG. 3C is a view illustrating a 3×3 window mask generated by a 5×7 sampling of the 5×9 window mask of FIG. 3A. The 5×7 sampling window samples pixels located in the first, third and fifth rows, and in the second, fifth and eighth columns of the 5×9 window mask, and is generated with respect to the central pixel (indicated as 'x') in the 5×9 window mask.

FIG. 3D is a view illustrating a 3×3 window mask generated by a 5×9 sampling of the 5×9 window mask of FIG. 3A. The 5×9 sampling samples pixels located in the first, third and fifth rows, and the first, fifth and ninth columns of the 5×9 window mask, and is generated with respect to the central pixel (indicated as 'x') in the 5×9 window mask.

FIG. 4A is a view illustrating a 5×9 window mask indicating the brightness values in a halftone image region. FIG. 4B is a view illustrating a 3×3 window mask generated by a 5×5 sampling of the 5×9 window mask of FIG. 4A (using rows 1, 3, and 5, and columns 3, 5, and 7). FIG. 4C is a view illustrating a 3×3 window mask generated by a 5×7 sampling of the 5×9 window mask in FIG. 4A (using rows 1, 3, and 5, and columns 2, 5, and 8). FIG. 4D is a view illustrating a 3×3 window mask generated by a 5×9 sampling of the 5×9 window mask of FIG. 4A (using rows 1, 3, and 5, and columns 1, 5, and 9).

Each pixel brightness value shown in FIGS. 3B through 3D and FIGS. 4B through 4D, can be compared to a threshold THb that is preset by a user, to calculate the binarization data value. For each pixel brightness value (BrV) that is less than the threshold THb, a binarization data of '1' is calculated, and for pixel brightness values that are greater than or equal to the threshold THb, a binarization data '0' is calculated. These relationships are illustrated in the table below. The threshold value THb can be a range of values. For example, 124 through 130 could be a threshold value THb. Also, the threshold value THb can be different among the different window masks shown in FIGS. 3B-3D.

|  | Binarization Data |
|---|---|
| BrV < THb | 1 |
| BrV => THb | 0 |

For example, the threshold THb of FIG. 3B can be 124, which is greater than 123 and less than 125. The threshold THb of FIG. 3C is greater than 125 and less than 144, while the threshold THb of FIG. 3D is greater than 150 and less than 159. The thresholds THb are set in advance by user. The threshold THb of FIG. 4B is 183, which is greater than 182 and less than 184. The threshold THb of FIG. 4C is greater than 180 and less than 187, and the threshold THb in (d) of FIG. 4D is more than 185 and less than 193.

FIGS. 3E through 3D are views illustrating several 3×3 window masks that indicate the binarization data values calculated in regard to FIGS. 3B through 3D, respectively, and FIGS. 4E through 4G are views illustrating several 3×3 window masks that indicate the binarization data values calculated in regard to FIGS. 4B through 4D, respectively. When the binarization is completed based on the above process, a successive arrangement of binarization data values is grouped into one group.

In a preferred embodiment of the present invention, only four directions are considered for the grouping: up, down, left and right. The diagonal direction is not considered when determining the grouping of a window mask. Grouping according to an embodiment of the present invention refers to the process of quantifying the physical locations of the binary data values in the binarization data value windows. Grouping is performed with respect to the binary "1" values only. As discussed above, the only directions that are considered in a preferred embodiment of the present invention are up, down, left and right. To group a binary data value window, the locations of the 1's are determined. All the 1's that are located to the left, right, up, and down of each other constitutes a group. If there are other 1's in the binary data value window that cannot reached from another 1 by an up, down left or right movement, that 1, or group of 1's constitutes another group. Hereinbelow, the number of groups will be referred to as a connected component value N for purposes of explanation of the embodiments of the present invention. When the process of grouping is completed, the number of the connected component value N of each 3×3 window is determined. Generally, the connected component value is 1 in a text region, and greater than or equal to 2 in a halftone image region.

Referring to FIGS. 3E through 3G, the connected component value N of the text region remains 1, even though several windows are used. For example, in FIG. 3E, each 1 in that binary data value window can be reached from another 1 by an up, down, left or right movement. The same is true for FIGS. 3F and 3G. Referring to FIGS. 4E through 4G, the connected component value N of a halftone image region is changed in accordance with the sampling mask. For example, FIG. 4E shows binarization values of a window of 5×5 sampled pixels, where the connected component value N is 1. FIGS. 4F and 4G show binarization values of windows of 5×7 and 5×9 sampled pixels, where the connected component value N is 2. In FIG. 4F, the first group is the lone 1 at the top left corner of the binary data value window. All the other 1's can be reached from each other by a left, right, up or down movement, and therefore constitute a single group. Thus, in FIG. 4F there are two groups, and N=2.

The edge of the text region is not very sensitive to the change of window sizes, whereas the edge of the halftone image is sensitive to the change of window sizes. Accordingly, if a plurality of windows are used as above, the probability of mis-classification can be decreased with respect to the image pixel. The connectivity of each binarization data of a plurality of windows is determined based on the each connected component value N, and in decision step S260, it is determined whether the window has connectivity.

If all the connected component values N of each window are 1, each binarization data of a plurality of windows is determined to have a connectivity ("Yes" path from decision step S260; step S300). If all the connected component values N of each window are not 1, each binarization data of a plurality of windows is determined to have no connectivity. If it is determined to have no connectivity, it is estimated to not be an edge ("No" path from decision step S260).

Because all the connected component values N of FIGS. 3E through 3G are 1, each binarization data of a plurality of windows is determined to have a connectivity. On the contrary, because all the connected component values N of FIGS. 4E) through 4G are not 1, each binarization data of the plurality of windows is determined to have no connectivity and estimated to not be an edge.

FIGS. 5A through 5C are exemplary views for measuring the similarity between connected components of the binarization connected component of a plurality of windows. Referring to FIGS. 5A-5C and equation 1 below, the similarity of the binarization data values between a plurality of windows can be determined. If the binarization data between a plurality of windows exhibits similarity, the region to which the windows pertain is estimated to be an edge. If there is no similarity between the binarization data between a plurality of windows, then the region to which the data pertains is estimated to not be an edge ("No" path from decision step S280; step S320).

To determine whether the binarization data values between a plurality of windows have a similarity, equation 1 is used:

$$\sum_{i=0}^{3}\sum_{j=0}^{3} a_{ij}b_{ij}c_{ij} \geq THc \quad \text{[Equation 1]}$$

wherein $a_{ij}$, $b_{ij}$, $c_{ij}$ are the binarization data values of each pixel in FIGS. 5A-C, and THc is a threshold preset by a user.

Generally, an edge of a text region has less change of location binarization as 1's, and an edge of a halftone image has greater change of the location being binarized as 1's, and therefore, a user needs to set a proper threshold THc. If equation 1 is satisfied, the binary data of a plurality of windows is determined to have a similarity so that it is estimated to be an edge. If equation 1 is not satisfied, the binary data of a plurality of windows is determined to not have similarity, so that it is estimated not to be an edge For example, if the threshold THc is set to '3' by a user, applying equation 1 to FIGS. 3E-G results in $$\sum_{i=0}^{3}\sum_{j=0}^{3} a_{ij}b_{ij}c_{ij} = 3,$$

and therefore, the region is estimated to be an edge. Regardless of whether the pixels are estimated to be an edge or not, the method according to an embodiment of the present invention from both the "yes" path from decision step 280, and step S320 proceed to step 340.

In step S340 of the method according to an embodiment of the present invention, pixels estimated to be an edge based on the process described above are labeled as E, and pixels estimated as no edge are labeled as N. When an edge is estimated based on the above process, the edge detection unit 20 removes the edge-estimated pixel from the halftone image region, and compensates for the non-edge estimated pixels of an actual edge region such as text, so that the edge can be finally detected.

FIG. 6A is a view illustrating a post-process region for detecting an edge, FIG. 6B is a view illustrating an example of a detected edge, and FIG. 6C is a view illustrating an example of detected non-edge. Referring to FIG. 6A, X indicates a target pixel to be emphasized. Referring to FIGS. 6B and 6C, the edge estimated pixels by the edge classification unit 10 are labeled as E, and non-edge estimated pixels are labeled as N.

The method according to an embodiment of the present invention determines in decision step S360, whether the number of edge estimated pixels E in the window of 9 pixels is greater than the preset threshold THd (S360). If the number of edge estimated pixels E is greater than the preset threshold THd ("Yes" path from decision step 360), it is finally determined to be an edge (step S380), while if not, it is determined to not be an edge in step S400 ("No" path from decision step 360).

The threshold THd is preset to 6 by a user according to an exemplary embodiment of the present invention. Referring back to FIG. 6B, the number of pixels labeled as E among the 9 pixels is 7 and therefore, it is finally determined to be an edge. Referring to FIG. 6C, the number of pixels labeled as E among 9 pixels is 5, and therefore, it is finally determined to not be an edge.

When the pixels corresponding to edges are detected based on the above process, the next step according to an embodiment of the present invention is executed to emphasize the output of the edge detected pixels (S420). For pixel emphasis, edge emphasizing filters such as unsharp masking are applied. Pixels detected as not being an edge are output as originally input.

According to one example of an emphasizing filter according to an embodiment of the present invention, the pixel brightness of the pixels to be emphasized is obtained based on equation 2 below;

$$L' = L + K(L - L'')$$ [Equation 2]

wherein L is an original pixel brightness to be emphasized, L" is an average brightness value in a window, and L' is an emphasized brightness value. K is an emphasis coefficient.

According to the exemplary embodiments as explained above, an actual edge of a text region is distinguished from an edge of an image region, and a high frequency improvement filter is applied only to the actual edge of the text region to prevent degradation of image quality. The edges of text and thin lines are easily determined and emphasized without any damage thereto, and therefore the quality of reproduced images can be substantially improved.

Additionally, the image enhancement method and device according to the exemplary embodiments of the present invention can provide improved image quality even with respect to the document of mixed text and images irrespective of LPI characteristics and therefore, high edge detection accuracy can be obtained even in documents being output based on a low LPI, such as newspapers.

Additionally, the image enhancement method and device according to the embodiments of the present invention is based on a threshold being preset by a user instead of an average value of window mask which is used in the conventional art, to keep the number of pixels having a binarization data value to 1. Accordingly, the possibility of misclassifying a text edge and a halftone image edge can be substantially decreased in the case of a diagonal edge.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A method of enhancing an image in an image processing device, the method comprising:
    determining whether a window brightness of a predetermined edge detection region defined by a window in an output screen of documents that include a text region and an image region exceeds a predetermined threshold THa when the difference between brightness values of pixels located in the window exceed the predetermined threshold Tha;
    determining if the brightness values of each pixel included in the window exceed a predetermined threshold THb when the window brightness exceeds the predetermined threshold THa;
    calculating binarization data values based on the pixel brightness values of a plurality of windows that are formed by applying different samplings to the predetermined edge detection region;
    determining a connectivity of the calculated binarization data values with respect to each of the plurality of windows;
    estimating the pixel to be an edge pixel when the binarization data values have a connectivity; and
    determining finally the estimated pixel to be an edge pixel when a number of estimated pixels is in excess of a predetermined preset value THd, and if not, determining the estimated pixel not to be an edge pixel.

2. The method of claim 1, wherein when the binarization data values have a connectivity, the step of estimating further comprises:
    determining a similarity of the binarization data values of pixels corresponding to each of the plurality of windows; and
    estimating the pixel to be an edge pixel when the binarization data values of the pixel corresponding to each of a plurality of windows have a similarity.

3. The method of claim 2, wherein the similarity of at least one of the binarization data values is determined by the equation;

$$\sum_{i=0}^{3} \sum_{j=0}^{3} a_{ij} b_{ij} c_{ij} \geq THc$$

wherein $a_{ij}$, $b_{ij}$, $c_{ij}$ are binarization data values of each pixel, THc is a predetermined threshold, and when satisfying with the equation, the binarization data values are considered to have a similarity.

4. The method of claim 1, further comprising a step of:
    emphasizing the pixel determined as an edge.

5. The method of claim 1, wherein the step of estimating comprises:
    estimating a pixel not to be an edge pixel when the difference of a pixel brightness value is less than the predetermined threshold Tha.

6. The method of claim 1, wherein the step of estimating comprises:
    estimating a pixel not to be an edge pixel when the binarization data values have no connectivity.

7. The method of claim 1, wherein the step of estimating comprises:
    estimating the predetermined pixel not to be an edge pixel when the binarization data values of the estimated pixel corresponding to a plurality of windows have no similarity.

8. The method of claim 1, wherein the step of calculating binarization data values comprises:
    generating a plurality of 3×3 window masks by applying different samplings to a 5×9 window of the predetermined edge detection region wherein the brightness values are indicated on each pixel;
    generating binarization data values from the brightness values of each pixel of a plurality of the sampled 3×3 window masks; and
    grouping the binarization data values to calculate a connected component value N with respect to each window mask.

9. The method of claim 8, wherein at least one of the binarization data values is '1' when the brightness values of each pixel is less than the predetermined threshold THb, and at least one of the binarization values is '0' when the brightness values of each pixel is in excess of the predetermined threshold THb.

10. The method of claim 8, wherein the binarization data values are estimated to have connectivity when all the connected component values N of each window mask are '1'.

11. The method of claim 1, wherein the samplings as applied comprise 5×5, 5×7 and 5×9 samplings with respect to a 600 dpi image.

12. An image enhancement apparatus, comprising:
 a luminosity variance measurement unit for determining the highest brightness value and the lowest brightness value among a plurality of pixels included in a predetermined window and for determining the predetermined window has a luminosity variance when the difference between the highest and lowest brightness values exceed a predetermined threshold THa;
 an edge classification unit for assigning binarization data values to each pixel in the predetermined window having the determined luminosity variance and for determining a connectivity of a plurality of windows corresponding to each predetermined window based on the binarization data values of each pixel within a corresponding predetermined window and for estimating an actual edge of a text region in a predetermined edge detection region of an output screen with respect to a document having a text region and an image region based on the connectivity of the plurality of windows;
 an edge detection unit for finally confirming an edge estimated pixel to be an edge pixel if the number of the pixels estimated as an edge is in excess of a predetermined preset threshold THd, and if not, determining the edge estimated pixel to not be an edge pixel; and
 an edge emphasis unit for emphasizing the pixel confirmed as an edge.

13. The image enhancement apparatus as claimed in claim 12, wherein the edge classification unit further comprises:
 a half tone detection unit for calculating at least one of the binarization data values based on each pixel brightness value of the pixels in the plurality of windows that are formed by applying various samplings to the predetermined edge detection region when the brightness values are in excess of a predetermined threshold THb, determining the connectivity of the calculated binarization data values with respect to each of the plurality of windows, determining a similarity of the binarization data values of pixels corresponding to the plurality of windows when the binarization values have a connectivity, and estimating the predetermined edge detection region as an edge when the binarization data values have a similarity.

14. The apparatus of claim 13, wherein at least one of the binarization data values includes a '1' if each pixel brightness is less than the predetermined threshold THb, and at least one of the binarization data values includes a '0' if each pixel brightness is in excess of the predetermined threshold THb.

* * * * *